(12) United States Patent
Yu

(10) Patent No.: US 7,944,684 B2
(45) Date of Patent: May 17, 2011

(54) NOTEBOOK COMPUTER WITH DOCUMENT HOLDING FUNCTION

(75) Inventor: Chien-Nan Yu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 108 days.

(21) Appl. No.: 12/472,491

(22) Filed: May 27, 2009

(65) Prior Publication Data

US 2010/0265654 A1    Oct. 21, 2010

(30) Foreign Application Priority Data

Apr. 17, 2009 (TW) ................................ 98112744 A

(51) Int. Cl.
*H05K 7/14* (2006.01)
(52) U.S. Cl. ........... 361/679.25; 361/679.23; 361/679.1; 361/679.26; 345/173; 248/917
(58) Field of Classification Search ............. 361/679.23, 361/679.25, 679.26, 679.08, 679.09, 679.55, 361/679.4, 679.1; 345/173; 248/917
See application file for complete search history.

(56) References Cited

U.S. PATENT DOCUMENTS

| 7,123,471 B2 * | 10/2006 | Wang et al. ............. 361/679.09 |
| 2009/0262204 A1 * | 10/2009 | Pai et al. ................. 348/207.11 |

FOREIGN PATENT DOCUMENTS

GB    2347813 A   *   9/2000

* cited by examiner

*Primary Examiner* — Jayprakash N Gandhi
*Assistant Examiner* — Ingrid Wright
(74) *Attorney, Agent, or Firm* — Kirton & McConkie; Evan R. Witt

(57) ABSTRACT

A notebook computer that has a document holding function includes an upper cover and a base. The upper cover includes a screen and an image pickup device. The base includes a keyboard and a touchpad. A touchpad chassis is disposed under the touchpad and connected with a bottom surface of the touchpad. A fixing recess is formed in an edge surface of the touchpad chassis for holding the document. A rotatable frame is disposed under the touchpad for overturning the touchpad chassis. As such, a shooting angle is defined between the image pickup device and the document held in the fixing recess.

6 Claims, 4 Drawing Sheets

NOTEBOOK COMPUTER WITH DOCUMENT HOLDING FUNCTION

FIELD OF THE INVENTION

The present invention relates to a notebook computer, and more particularly to a notebook computer having a document holding function.

BACKGROUND OF THE INVENTION

Notebook computers have experienced great growth and are now rapidly gaining in popularity. Due to the advantages of small size, light weightiness and easy portability, notebook computers become essential components for the businessmen when travelling to other places or taking part in meetings. With the maturity of digitization techniques, the commercial available notebook computer is usually equipped with an image pickup device such as a web camera or a camera. The desired images could be captured by the image pickup device. Recently, the image scanner is gradually replaced by the image pickup device.

For example, after the user has visited customers or taken part in a meeting, the basic information associated with the business cards of the customers or conferees needs to be filed in order to quickly search the basic information in the further. For convenience, after the image of the card is captured by the image pickup device, the image data can be immediately recognized or filed by associated software or hardware components of the notebook computer. As such, the information associated with the business card is digitized. Moreover, it is also convenient to capture the images of other documents having size similar to the business card by the image pickup device of the notebook computer. Another example of the document includes but is not limited to a photograph, a credit card, a debit card, an identification card, an envelope, a postcard, a ticket card, a notepaper, a bookmark and the like.

When an image pickup device of a notebook computer is used to capture the image of a document, some difficulties possibly occur. For example, it is critical to hold the document steady. For capturing the image of an article contained in the document by the image pickup device of the notebook computer, if this document is held by the user's hand, the document is readily rocked due to the long holding time. Under this circumstance, the obtained document image is usually blurred. For preventing from rocking of the document and thus obtaining a sharp document image, a static document stand is used for holding the document steady.

The use of the document stand, however, incurs another problem. In a case that the document stand is used in other places, the user should carry the notebook computer and the document stand at the same time, which is very troublesome to the user.

SUMMARY OF THE INVENTION

An object of the present invention provides a notebook computer having an image pickup device to capture an image of a document.

Another object of the present invention provides a notebook computer having a document holding function.

In accordance with an aspect of the present invention, there is provided a notebook computer having a document holding function to facilitate capturing an image of a document. The notebook computer includes an upper cover and a base. The upper cover includes a screen and an image pickup device. The screen is used for outputting the image of the document. The image pickup device is arranged on a rim of the screen for capturing the image of the document. The base is pivotally coupled with the upper cover. The base includes a keyboard, a touchpad, a touchpad chassis, a fixing recess, a concave structure and a rotatable frame. The keyboard is used for inputting characters or signs to the notebook computer. The touchpad serves as a pointing device. The touchpad chassis has a top surface connected with a bottom surface of the touchpad. The fixing recess is formed in an edge surface of the touchpad chassis for holding the document. The concave structure is used for accommodating the touchpad and the touchpad chassis. The rotatable frame is disposed within the concave structure for overturning the touchpad chassis, so that a shooting angle is defined between the image pickup device and the document held in the fixing recess.

In an embodiment, the rotatable frame includes a first gliding block, a first guiding shaft, a second gliding block, a second guiding shaft, a first rotating rod, a second rotating rod. The first guiding shaft is fixed at a first side of the concave structure and penetrates through the first gliding block, so that the first gliding block is movable along the first guiding shaft. The second guiding shaft is fixed at a second side of the concave structure and penetrates through the second gliding block, so that the second gliding block is movable along the second guiding shaft. The first rotating rod and the second rotating rod have respective first ends pivotally coupled to the first gliding block and the second gliding block, thereby performing a pivoting action. A first lateral surface and a second lateral surface of the touchpad chassis are pivotally coupled to respective second ends of the first rotating rod and the second rotating rod, thereby performing another pivoting action.

In an embodiment, a first cylindrical post is formed on the first end of the first rotating rod, a first circular indentation is formed in the first gliding block for accommodating the first cylindrical post, a second cylindrical post is formed on the first end of the second rotating rod, and a second circular indentation is formed in the second gliding block for accommodating the second cylindrical post.

In an embodiment, a first rubbery tube is disposed within the first circular indentation and sheathed by an inner wall of the first circular indentation, and a second rubbery tube is disposed within the second circular indentation and sheathed by an inner wall of the second circular indentation.

In an embodiment, a third cylindrical post is formed on the first lateral surface of the touchpad chassis, a third circular indentation is formed on the second end of the first rotating rod for accommodating the third cylindrical post, a fourth cylindrical post is formed on the second lateral surface of the touchpad chassis, and a fourth circular indentation is formed on the second end of the second rotating rod for accommodating the fourth cylindrical post.

In an embodiment, a third rubbery tube is disposed within the third circular indentation and sheathed by an inner wall of the third circular indentation, and a fourth rubbery tube is disposed within the fourth circular indentation and sheathed by an inner wall of the fourth circular indentation.

In an embodiment, a junction between a lower surface and the edge surface of the touchpad chassis is curvy.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
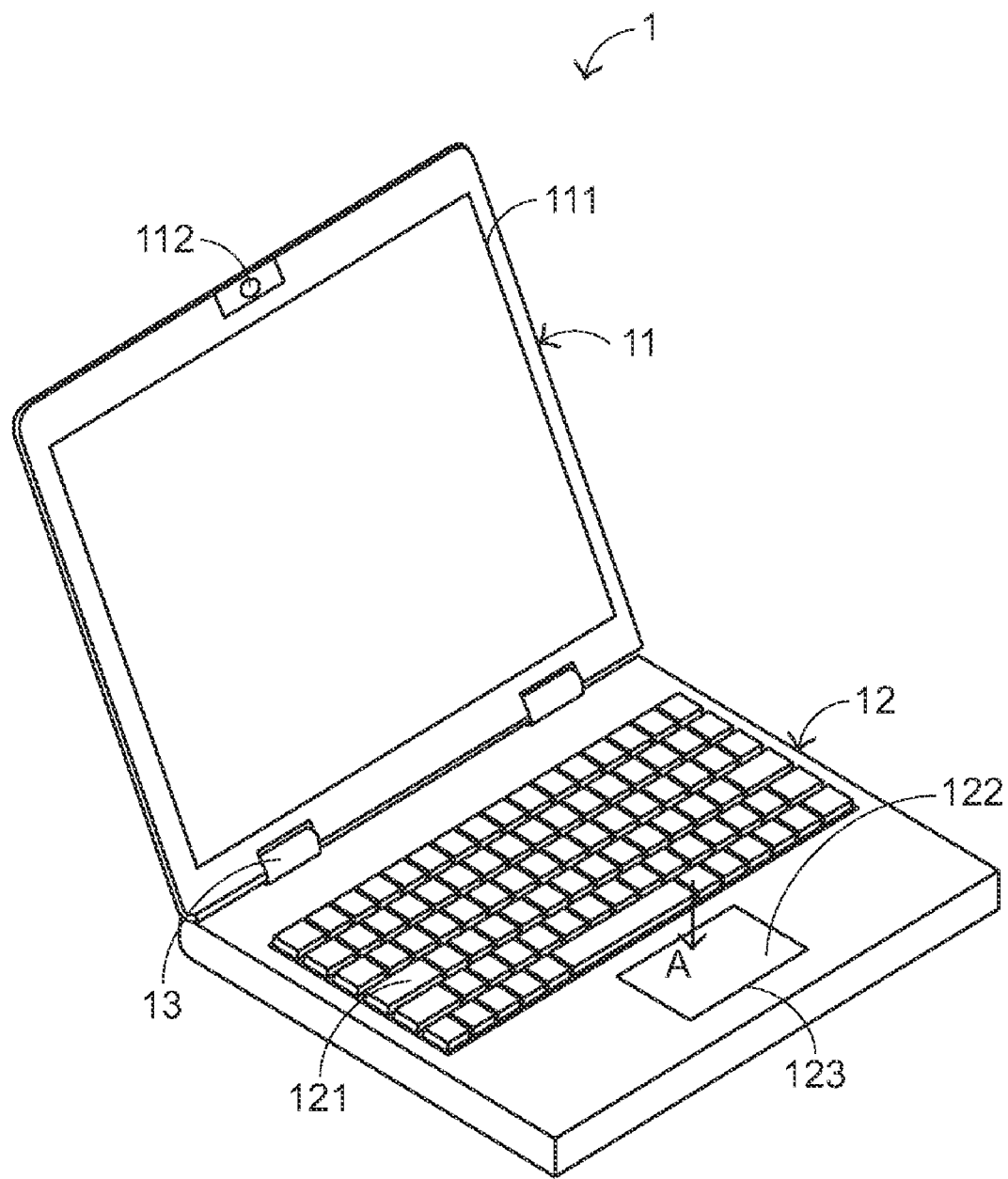
FIG. 1 is a schematic perspective view illustrating the outward appearance of a notebook computer according to an embodiment of the present invention.

FIG. 1 is a schematic perspective view illustrating the outward appearance of a notebook computer according to an embodiment of the present invention. The notebook computer 1 comprises an upper cover 11 and a base 12. The upper cover 11 is pivotally coupled with the base 12 through a rotating shaft 13 such that the upper cover 11 is rotatable with respect to the base 12. The upper cover 11 comprises a screen 111 and an image pickup device 112. The image pickup device 112 is disposed on an upper rim of the screen 111 for capturing an image of a document. After an image of a document is captured by the image pickup device 112, the document image is shown on the screen 111. Moreover, the image data could be recognized, filed or stored by associated software or hardware components of the notebook computer 1. A keyboard 121 is disposed on the base 12. Via the keyboard 121, the user can input characters or signs into the notebook computer 1. A touchpad 122 is disposed on the base 12 as a pointing device. In addition, the base 12 has a concave structure 123 for accommodating the touchpad 122.

Moreover, a touchpad chassis (not shown in FIG. 1) is disposed under the touchpad 122. A top surface of the touchpad chassis is connected with the bottom surface of the touchpad 122. A fixing recess is formed in an edge surface of the touchpad chassis for holding the document to be shot by the image pickup device. In addition, a rotatable frame (not shown in FIG. 1) is also disposed on the base 12 of the notebook computer 1 for overturning the touchpad chassis. For capturing the image of the document, the user could rotating the rotatable frame to expose the fixing recess that is disposed in the edge surface of the touchpad chassis. As such, the document could be fixed in the fixing recess. As shown in FIG. 1, the document holding function of the notebook computer 1 is not employed. Under this circumstance, the touchpad chassis and the rotatable frame are both disposed within the concave structure 123 and under the touchpad 122. As such, the touchpad chassis and the rotatable frame are not shown in FIG. 1. Hereinafter, the configurations of the touchpad chassis and the rotatable frame will be illustrated in more details with reference to FIGS. 2, 3 and 4.

Figure 2:
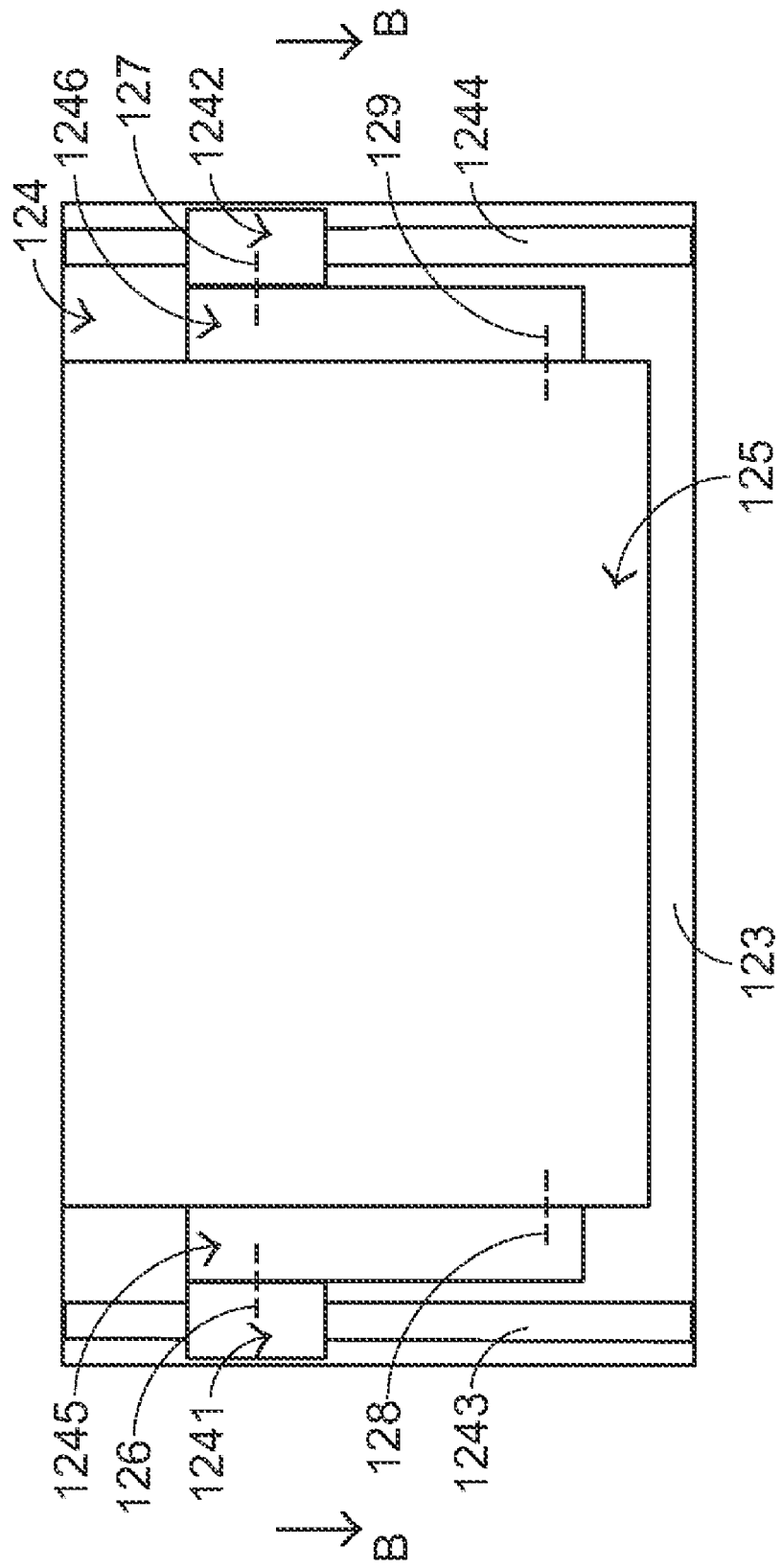
FIG. 2 is schematic view illustrating the outward appearance of the touchpad chassis and the rotatable frame according to an embodiment of the present invention.

FIG. 2 is schematic view illustrating the outward appearance of the touchpad chassis and the rotatable frame according to an embodiment of the present invention. As shown in FIG. 2, the rotatable frame comprises a first gliding block 1241, a second gliding block 1242, a first guiding shaft 1243, a second guiding shaft 1244, a first rotating rod 1245 and a second rotating rod 1246. The first guiding shaft 1243 is fixed at a first side of the concave structure 123. The first guiding shaft 1243 penetrates through the first gliding block 1241 such that the first gliding block 1241 is movable along the first guiding shaft 1243. The second guiding shaft 1244 is fixed at a second side of the concave structure 123. The second guiding shaft 1244 penetrates through the second gliding block 1242 such that the second gliding block 1242 is movable along the second guiding shaft 1244. A first end of the first rotating rod 1245 is pivotally coupled to the first gliding block 1241. A second end of the first rotating rod 1245 is pivotally coupled to a first lateral surface of the touchpad chassis 125.

A first end of the second rotating rod 1246 is pivotally coupled to the second gliding block 1242. A second end of the second rotating rod 1246 is pivotally coupled to a second lateral surface of the touchpad chassis 125. The top surface of the touchpad chassis 125 is connected with the bottom surface of the touchpad 122 (not shown in FIG. 2). As such, the touchpad chassis 125 is rotated upon rotation of the touchpad 122.

Figure 3:
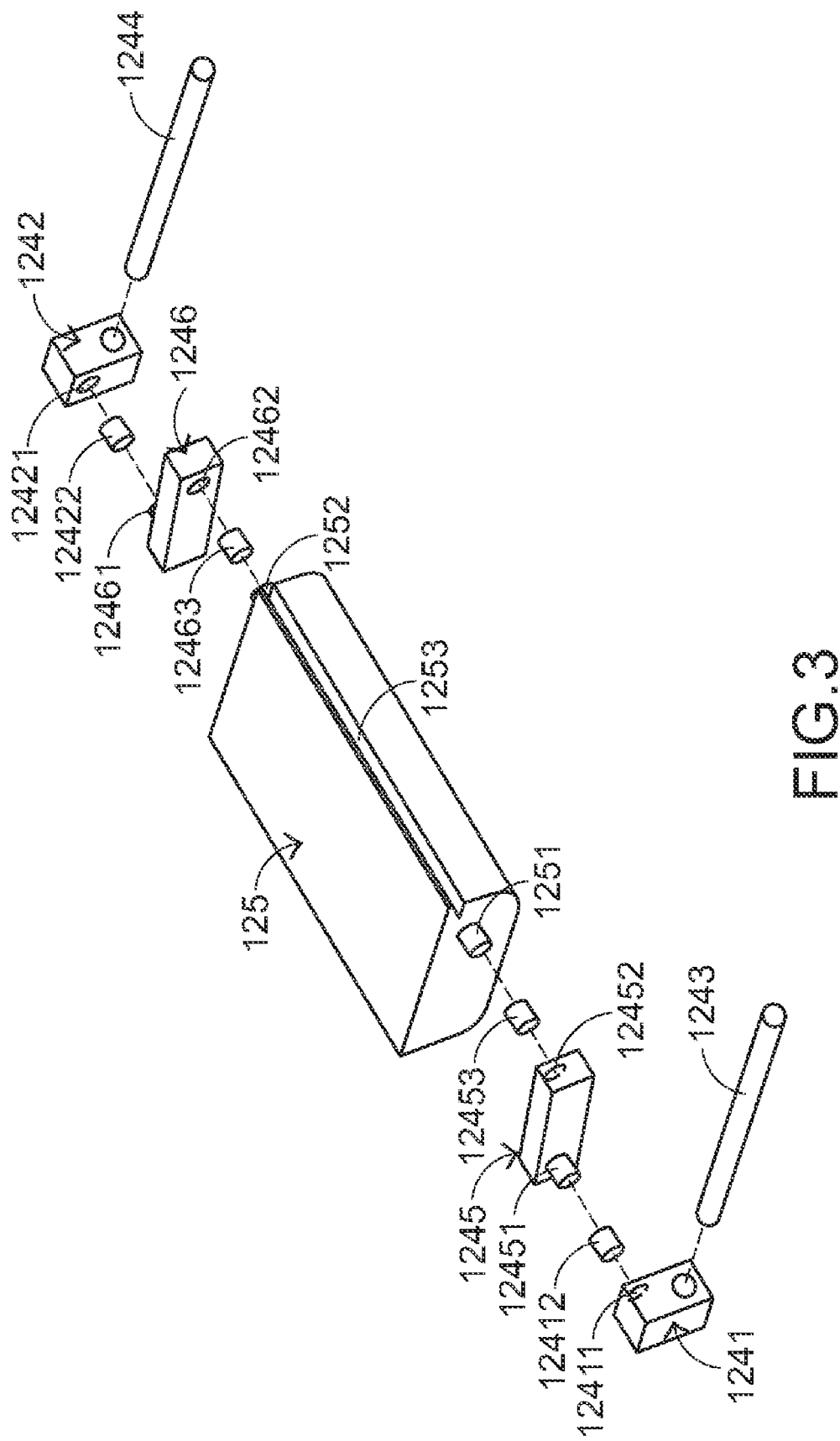
FIG. 3 is schematic exploded view illustrating the touchpad chassis and the rotatable frame according to an embodiment of the present invention.

FIG. 3 is schematic exploded view illustrating the touchpad chassis and the rotatable frame according to an embodiment of the present invention. Please refer to FIG. 2 and FIG. 3. A first cylindrical post 12451 is formed on a first end of the first rotating rod 1245. A first circular indentation 12411 is formed in the first gliding block 1241 for accommodating the first cylindrical post 12451. When the first cylindrical post 12451 is accommodated within the first circular indentation 12411, the first cylindrical post 12451 is pivotally coupled with the first circular indentation 12411 at a first pivotal end 126. Alternatively, a first rubbery tube 12412 is disposed within the first circular indentation 12411 such that the first cylindrical post 12451 is sheathed by the first rubbery tube 12412.

A second cylindrical post 12461 is formed on a first end of the second rotating rod 1246. A second circular indentation 12421 is formed in the second gliding block 1242 for accommodating the second cylindrical post 12461. When the second cylindrical post 12461 is accommodated within the second circular indentation 12421, the second cylindrical post 12461 is pivotally coupled with the second circular indentation 12421 at a second pivotal end 127. As such, a pivoting action is simultaneously performed at the first pivotal end 126 and the second pivotal end 127. Alternatively, a second rubbery tube 12422 is disposed within the second circular indentation 12421 such that the second cylindrical post 12461 is sheathed by the second rubbery tube 12422.

In addition, a third cylindrical post 1251 is formed on the first lateral surface of the touchpad chassis 125. A third circular indentation 12452 is formed at the second end of the first rotating rod 1245 for accommodating the third cylindrical post 1251. When the third cylindrical post 1251 is accommodated within the third circular indentation 12452, the third cylindrical post 1251 is pivotally coupled with the third circular indentation 12452 at a third pivotal end 128. Alternatively, a third rubbery tube 12453 is disposed within the third circular indentation 12452 such that the third cylindrical post 1251 is sheathed by the third rubbery tube 12453.

In addition, a fourth cylindrical post 1252 is formed on the second lateral surface of the touchpad chassis 125. A fourth circular indentation 12462 is formed on the second end of the second rotating rod 1246 for accommodating the fourth cylindrical post 1252. When the fourth cylindrical post 1252 is accommodated within the fourth circular indentation 12462, the fourth cylindrical post 1252 is pivotally coupled with the fourth circular indentation 12462 at a fourth pivotal end 129. As such, a pivoting action is simultaneously performed at the third pivotal end 128 and the fourth pivotal end 129. Alternatively, a fourth rubbery tube 12463 is disposed within the fourth circular indentation 12462 such that the fourth cylindrical post 1252 is sheathed by the fourth rubbery tube 12463.

Figure 4:
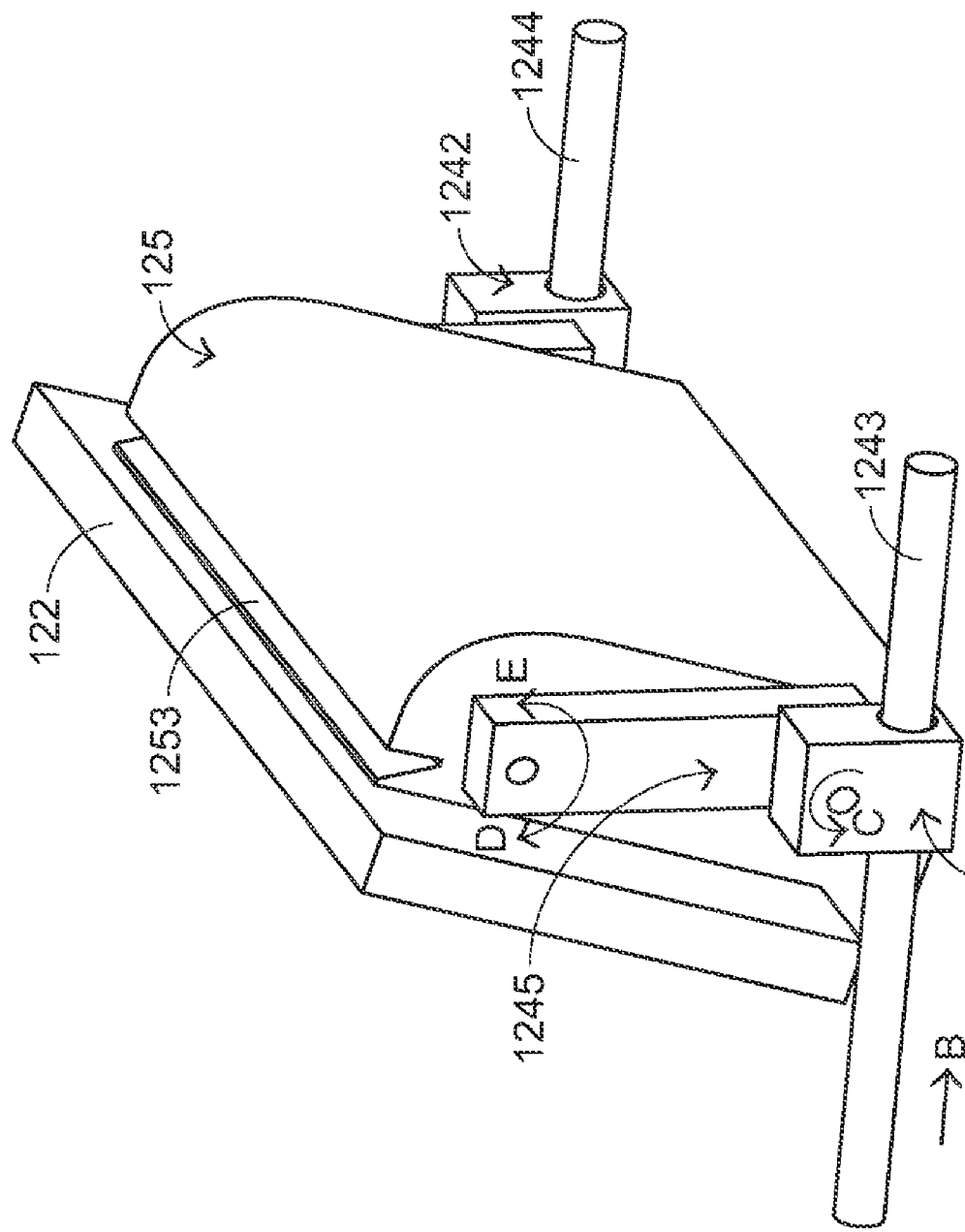
FIG. 4 is schematic perspective view illustrating the action of the rotatable frame to perform the document holding function according to an embodiment of the present invention.

FIG. 4 is schematic perspective view illustrating the action of the rotatable frame to perform the document holding function according to an embodiment of the present invention. Hereinafter, the operations of the notebook computer having a document holding function according to the present invention will be illustrated with reference to FIG. 4 as well as FIGS. 1 and 2.

For holding the document, the touchpad 122 is pressed down by a user in the downward direction A. In response to the depressing force, the touchpad chassis 125 is rotated. As such, the first gliding block 1241 and the second gliding block 1242 are respectively moved along the first guiding shaft 1243 and the second guiding shaft 1244 in the direction B (see also FIG. 2). At the same time, the first rotating rod 1245 and the second rotating rod 1246 are simultaneously rotated in the direction C. As the touchpad chassis 125 is continuously rotated, the touchpad chassis 125 is uplifted such that the fixing recess 1253 formed in the edge surface of the touchpad chassis 125 is distant from the concave structure 123. Meanwhile, the document to be shot by the image pickup device 112 could be placed in the fixing recess 1253. Moreover, since the junction between the lower surface and the edge surface of the touchpad chassis 125 is curvy, the possibility of causing collision of the edge surface of the touchpad chassis 125 with the inner wall of the concave structure 123 will be minimized.

After the document to be shot is held in the fixing recess 1253, a shooting angle is defined between the image pickup device 112 (see FIG. 1) and the document held in the fixing recess 1253. At this moment, the touchpad chassis 125 could be rotated in the direction D or E in order to adjust the shooting angle. As such, a sharp image of the document is captured by the image pickup device 112.

By the way, the first rubbery tube 12412 and the second rubbery tube 12422, which are respectively disposed within the first circular indentation 12411 and the second circular indentation 12421, could offer friction forces on the first cylindrical post 12451 and the second cylindrical post 12461. Due to the friction forces, the first rotating rod 1245 and the second rotating rod 1246 could be stood upright without being inclined or swung. Similarly, the third rubbery tube 12453 and the fourth rubbery tube 12463, which are respectively disposed within the third circular indentation 12452 and the fourth circular indentation 12462, could offer friction forces on the third cylindrical post 1251 and the fourth cylindrical post 1252. Due to the friction forces, the touchpad chassis 125 could be maintained steady without rocking in order to keep the desired shooting angle.

From the above description, the notebook computer is capable of implementing the document holding function without the need of changing the outward appearance thereof. Since the document to be shot by the image pickup device can be held in the fixing recess, the user does not need to carry an additional document stand when the notebook computer is used in mobile commerce. After an image of the document is captured by the image pickup device, the image data could be recognized, filed or stored by associated software or hardware components of the notebook computer.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A notebook computer having a document holding function to facilitate capturing an image of a document, said notebook computer comprising:
   an upper cover comprising:
   a screen for outputting said image of said document;
   an image pickup device arranged on a rim of said screen for capturing said image of said document; and
   a base pivotally coupled with said upper cover, and comprising:
   a keyboard for inputting characters or signs to said notebook computer;
   a touchpad serving as a pointing device;
   a touchpad chassis having a top surface connected with a bottom surface of said touchpad;
   a fixing recess formed in an edge surface of said touchpad chassis for holding said document;
   a concave structure for accommodating said touchpad and said touchpad chassis; and
   a rotatable frame disposed within said concave structure for overturning said touchpad chassis, so that a shooting angle is defined between said image pickup device and said document held in said fixing recess, wherein said rotatable frame comprises:
   a first gliding block;
   a first guiding shaft fixed at a first side of said concave structure and penetrating through said first gliding block, so that said first gliding block is movable along said first guiding shaft;
   a second gliding block;
   a second guiding shaft fixed at a second side of said concave structure and penetrating through said second gliding block, so that said second gliding block is movable along said second guiding shaft; and
   a first rotating rod and a second rotating rod having respective first ends pivotally coupled to said first gliding block and said second gliding block, thereby performing a pivoting action,
   wherein a first lateral surface and a second lateral surface of said touchpad chassis are pivotally coupled to respective second ends of said first rotating rod and said second rotating rod, thereby performing another pivoting action.

2. The notebook computer having a document holding function according to claim 1 wherein a first cylindrical post is formed on said first end of said first rotating rod, a first circular indentation is formed in said first gliding block for accommodating said first cylindrical post, a second cylindrical post is formed on said first end of said second rotating rod, and a second circular indentation is formed in said second gliding block for accommodating said second cylindrical post.

3. The notebook computer having a document holding function according to claim 2 wherein a first rubbery tube is disposed within said first circular indentation and sheathed by an inner wall of said first circular indentation, and a second rubbery tube is disposed within said second circular indentation and sheathed by an inner wall of said second circular indentation.

4. The notebook computer having a document holding function according to claim 1 wherein a third cylindrical post is formed on said first lateral surface of said touchpad chassis, a third circular indentation is formed on said second end of said first rotating rod for accommodating said third cylindrical post, a fourth cylindrical post is formed on said second lateral surface of said touchpad chassis, and a fourth circular indentation is formed on said second end of said second rotating rod for accommodating said fourth cylindrical post.

5. The notebook computer having a document holding function according to claim 4 wherein a third rubbery tube is disposed within the third circular indentation and sheathed by an inner wall of said third circular indentation, and a fourth rubbery tube is disposed within said fourth circular indentation and sheathed by an inner wall of said fourth circular indentation.

6. The notebook computer having a document holding function according to claim 1 wherein a junction between a lower surface and said edge surface of said touchpad chassis is curvy.

* * * * *